UNITED STATES PATENT OFFICE.

JOHN LUMLEY, OF SAN FRANCISCO, CALIFORNIA, ASSIGNOR OF ONE-HALF TO WILLIAM BORROWE, OF SAME PLACE.

HEAT-INSULATING ARTICLE.

SPECIFICATION forming part of Letters Patent No. 591,409, dated October 12, 1897.

Application filed August 24, 1896. Serial No. 603,744. (No specimens.)

*To all whom it may concern:*

Be it known that I, JOHN LUMLEY, a citizen of the United States, and a resident of the city and county of San Francisco, State of California, have invented a new and useful Article for Insulating or Resisting the Passage, Convection, and Radiation of Heat; and I hereby declare the following specification to be a full, clear, and exact description of my invention, also the method of preparing and applying the same in practice.

My invention relates to insulating coverings and linings to resist the passage of heat to or from vessels, pipes, or chambers of any kind, both with respect to the loss of heat or the protection of substances or commodities thereby affected, and especially to coverings for steam vessels or pipes and chambers for cooling or congealing; also for covering the walls of buildings or any kind of structure as a preventive of fire and for insulation.

My invention has for its object providing an article and commodity of high insulating quality composed of natural elements mainly indigenous and easy to procure, elastic, refractory, and molded into various forms or made into webs or sheets.

In preparing my heat-insulating article I employ infusorial earth, commonly called "fossil meal," mixed with the fiber of *Typha latifolia*, commonly called "cat-tail plant," preferably one hundred and ninety-two pounds of the fossil meal to eight pounds of the fiber. These two elements are mixed together, saturated with water, and placed in a vessel provided with macerating and mixing machinery that thoroughly disintegrates and incorporates the fibrous part with the earthy or granular one. This is the sole process required in preparing the said compound ready for molding into forms preliminary to the process of drying.

The amount of water added to the materials is in weight about fifty pounds for each one hundred pounds of the fossil meal and cat-tail fiber, so that when mixed and prepared the resulting mass will be fluid or plastic, as the molding processes may render most convenient. If to be poured into the ends of molds, as in the case of making pipe-coverings of segmental or cylindrical form, I use a larger quantity of water, so as to render the compound fluid. If to be formed into sheets or pressed into open-sided molds, less water is used and the material left in a plastic state, in which form it is more readily dried.

In order to extract the contained moisture and compact and properly set the material preparatory to drying the said article, I subject it to centrifugal action in an apparatus specially designed for the purpose, by which means all portions of the mass are acted on uniformly, with the result that no other ingredients except the fossil meal and the fiber above mentioned are necessary to produce tubes, blocks, slabs, and other forms of coverings adherent enough to be handled and applied. This process and apparatus, however, form no part of my present invention.

The cat-tail fiber herein referred to consists of the pod that forms on the top of the plant *Typha latifolia*, consisting of a mass of radial silky fiber that, when the plant is matured and these pods are dried, can be rapidly stripped off by machiney or by hand and placed in bags or packages for shipment and use. The peculiar structure of these fibers, which are of a hollow or tubulous section, produce in the finished material myriads of cells, in which fixed air is contained, forming a medium highly resistant to the passage of heat. At the same time the fibrous nature of this material gives cohesion and elasticity to the earthy and granular element combined therewith.

I do not confine myself to the exact proportion of the ingredients named, because it will be obvious that the proportions of fossil meal and fiber can be varied to a considerable extent without departing from my invention, and it will also be obvious that for different purposes the proportion of these ingredients should be varied. For example, in cases where the material is subjected to great and sudden changes of temperature or to the jar and vibration of machinery, as in the case of steam or other heat engines and pipes therefor, the amount of fiber and consequent cohesive strength should be greater than when the material is applied on static structures.

In the latter case the earthy element can form a larger proportion of the compound than is named in the formula given.

Having thus described the nature and objects of my invention and the method of applying the same in practice, what I claim as new, and desire to secure by Letters Patent, is—

As a new article of manufacture, the herein-described heat-insulating product for coverings, linings, &c., consisting of infusorial earth or "fossil meal" and the fiber of "*Typha latifolia*" intimately mixed in suitable proportions, molded into forms, and dried in coherent blocks, masses or sheets, substantially as specified.

In testimony whereof I have hereunto affixed my signature in the presence of two witnesses.

JOHN LUMLEY.

Witnesses:
WILLIAM BORROWE,
W. T. GROVER.